United States Patent
Zhang

(10) Patent No.: US 10,691,732 B1
(45) Date of Patent: Jun. 23, 2020

(54) TEXT UNDERSTANDING METHODS AND SYSTEM FOR MATCHING JOB AND RESUME DOCUMENTS

(71) Applicant: Guangsheng Zhang, Palo Alto, CA (US)

(72) Inventor: Guangsheng Zhang, Palo Alto, CA (US)

(*) Notice: Subject to any disclaimer, the term of this patent is extended or adjusted under 35 U.S.C. 154(b) by 256 days.

(21) Appl. No.: 15/602,129

(22) Filed: May 23, 2017

Related U.S. Application Data

(63) Continuation of application No. 14/205,380, filed on Mar. 12, 2014, now Pat. No. 9,665,641.

(60) Provisional application No. 61/809,893, filed on Apr. 9, 2013.

(51) Int. Cl.
  *G06F 16/20* (2019.01)
  *G06F 16/33* (2019.01)
  *G06F 16/28* (2019.01)
  *G06F 16/2457* (2019.01)

(52) U.S. Cl.
  CPC .... *G06F 16/3331* (2019.01); *G06F 16/24578* (2019.01); *G06F 16/285* (2019.01)

(58) Field of Classification Search
  None
  See application file for complete search history.

(56) References Cited

U.S. PATENT DOCUMENTS

| | | | |
|---|---|---|---|
| 6,832,224 B2* | 12/2004 | Gilmour | G06Q 10/107 |
| 7,836,060 B1* | 11/2010 | Rennison | G06F 16/334 |
| | | | 707/749 |
| 8,156,051 B1 | 4/2012 | Shah et al. | |
| 8,280,823 B1 | 10/2012 | Obeid | |
| 8,595,149 B1 | 11/2013 | Obeid | |
| 2005/0080656 A1 | 4/2005 | Crow | |
| 2010/0114789 A1 | 5/2010 | Dane | |
| 2012/0246168 A1 | 9/2012 | Srivastava et al. | |
| 2012/0265770 A1 | 10/2012 | Desjardins et al. | |
| 2012/0330708 A1 | 12/2012 | Khan | |
| 2014/0122355 A1* | 5/2014 | Hardtke | G06Q 10/105 |
| | | | 705/321 |
| 2014/0214710 A1 | 7/2014 | Dubner et al. | |

* cited by examiner

*Primary Examiner* — Belix M Ortiz Ditren

(57) ABSTRACT

System, methods, and user interface for searching documents related to resumes or job descriptions as a special type of unstructured data. The methods automatically transform a source document such as a resume or job description into a search query, and retrieve target documents matching the most important contents in the source document without requiring a user to open and read the source document and write a query. The methods identify the most representative attributes in such documents based on grammatical, semantic, and contextual information contained in the documents for producing more effective and relevant search results than manually-constructed search queries.

20 Claims, 10 Drawing Sheets

| Term | Importance score |
|---|---|
| Java | 1 |
| Python | 1 |
| Hadoop | 0.5 |
| Lucene | 0.5 |
| ... | ... |

Figure 2

Specify requirements as search parameters:

| Qualification: | Requirement: | Importance: |
|---|---|---|
| Skill A | 3 years | 0.7 |
| Skill B | 4 years | 0.85 |
| ... | ... | ... |

| Skill Name | Candidate Strength Score |
|---|---|
| Java | 1 |
| Python | 0.8 |
| Hadoop | 0.7 |
| Lucene | 0.4 |
| ... | ... |

Figure 7A

| Skill Name | Candidate Strength Score | Requirement Importance score |
|---|---|---|
| Java | 0.8 | 1 |
| Python | 0.8 | 1 |
| Hadoop | 0.7 | 0.5 |
| C++ | 0.9 | 0.5 |
| Project Lead | 0 | 0.6 |

Figure 7B 730    740    750

| Skill Name | Your Strength Score | Average from other applicants |
|---|---|---|
| Java | 0.8 | 0.9 |
| Python | 0.9 | 0.6 |
| Hadoop | 0.4 | 0.5 |
| C++ | 0.9 | 0.5 |
| ... | ... | ... |

Figure 8

TEXT UNDERSTANDING METHODS AND SYSTEM FOR MATCHING JOB AND RESUME DOCUMENTS

CROSS REFERENCE AND RELATED APPLICATIONS

The present application is a Continuation Application of and claims priority to U.S. patent application Ser. No. 14/205,380, entitled "System, Methods, and User Interface for Automated Job Search", filed on Mar. 12, 2014. U.S. patent application Ser. No. 14/205,380 claims priority to U.S. Provisional Patent Application 61/809,893 entitled "System, Methods, and User Interface for Automatically Presenting Information Based on Relevance" filed on Apr. 9, 2013, the disclosures of which are incorporated herein by reference.

BACKGROUND OF THE INVENTION

Data that can be entered and stored in a database and then retrieved by performing a query with what is known as "structured query language" (SQL) is generally known as "structured" data. In contrast, most text documents are known as "unstructured" data, data that cannot fit easily into a structured or table format.

This lack of structure makes some special types of documents, such as resumes and job postings, not easily searchable in their original format as unstructured data unless information in the documents are extracted or entered into a database.

A major problem with such structured-data based approaches is that they require much human efforts in extracting data from the documents and then entering data into the database, either by job seekers or by job service providers.

Another major problem is that when searching a resume database after receiving a job description, a recruiter need to spend time digesting the content of the document to accurately identify the key requirements, and then distill such requirements into a few query terms. It is a process that requires much training and experience, as well as much effort for each query.

On the other hand, while document-index-based search engines work well for unstructured data such as web pages or emails, without first converting the documents into structured data formats, they fall short for the purpose of searching special documents such as resumes or job postings, etc.

Conventional document search methods are mostly keyword-based. The query box can only accept a few keywords. However, when a user needs to search special types of documents such as resumes or job postings, or other unstructured data sources, which contain comprehensive information and various ways of representing information, a query that contains only a few keywords usually cannot adequately represent the topics and the scope of the needed information.

More effective methods for searching unstructured data are needed.

SUMMARY OF THE INVENTION

The present invention provides novel methods for searching resumes or job descriptions without requiring the user to perform a keyword-based search. The methods automatically analyze the content of a resume document or a job description document and transform the document into a search query, and perform a search without requiring the user to open and read the document.

The present invention also provides methods of analyzing the text contents in such documents to identify the most important or the most representative contents based on grammatical, semantic, and contextual information contained in the documents, and extracting such information to automatically construct a query, and then comparing the key information in a job description with the key information in a resume document, and retrieve the search results that can be expected to be more relevant than those based on manually-constructed search queries.

In some embodiments, the present invention further identifies the strength of skills or experiences of a job seeker, and generates a report to show how well a candidate matches a position. Furthermore, in some embodiments, the present invention separates the search results into different groups, based on the strength of the candidates in terms of being senior, medium-level, or junior candidates, etc.

In some embodiments, methods and user interface are provided for the user to specify a value indicating the desired importance of an attribute.

BRIEF ILLUSTRATION OF FIGURES

FIG. 2 shows an exemplar term vector based on a job description document.

FIG. 6 shows an exemplar search interface and a document creation template according to an aspect of the present invention.

FIG. 7A is an illustration of part of a report showing the strength scores of itemized skills or experiences of a candidate.

FIG. 7B is an illustration of a report showing the strength scores of itemized skills or experiences of a candidate in comparison with a particular job description.

FIG. 8 is an illustration of a report with comparison of strength scores with other persons.

DETAILED DESCRIPTION OF THE INVENTION

Figure 1:
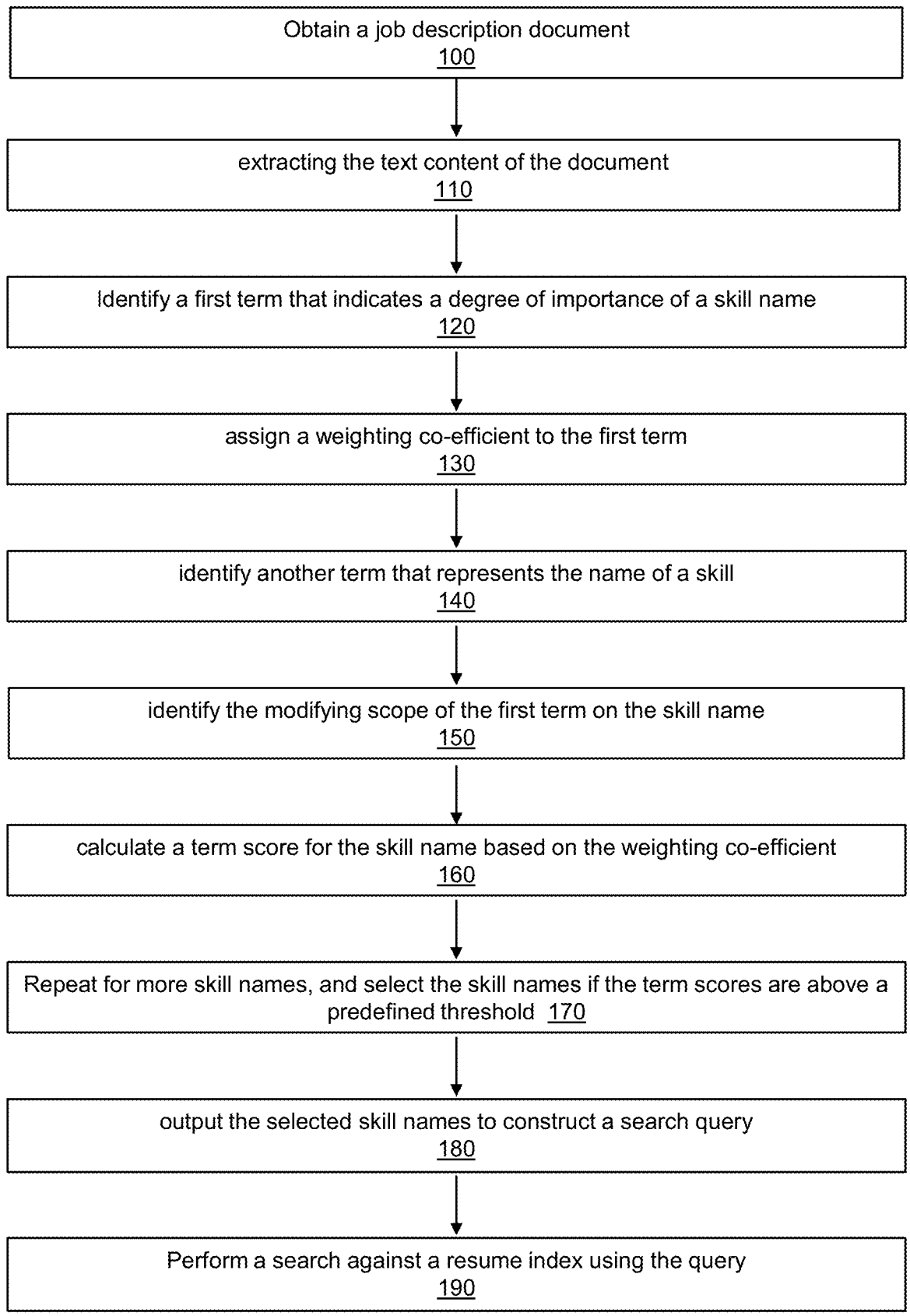
FIG. 1 is an exemplar flow chart illustrating the process of automatically searching a resume index based on a job description document.

Documents such as resumes or job descriptions are different from other types of documents such as Web pages, in that they cover multiple aspects of a job qualifications or requirements, which cannot be easily summarized into a few words. When the resumes are not stored in the structured format such as in a relational database, searching for a suitable candidate from a resume repository can be difficult and time-consuming, as a search query based on a few keywords are not an effective way to find relevant documents of this type.

In the case of finding a suitable candidate for a job position, a recruiter usually receives a job description as a type of unstructured data. The recruiter needs to understand the content of the document, and distill the key information on requirements written in the multiple paragraphs into a few keywords to search a resume repository. However, often a job description document can be long with multiple requirements of different degrees of importance, and cannot be adequately represented by a few keywords.

To facilitate the process of searching a resume repository with a job description, the present invention first determines the importance of the requirements as they are written in the document by performing a content analysis on the text used in the document, and assigns an importance score to the terms in the document to represent their relative importance, and then extracts the most important terms from the document and uses such terms to construct a search query.

On the other hand, for searching a job posting repository with a resume document, the present invention also determines the strength of the job skills or experiences as they are written in the resume document, by performing a content analysis on the text used in the document, and assigns a strength score to the terms in the document to represent their relative importance, and then extracts the most important terms from the document and uses such terms to construct a search query.

For ease of illustration, the examples in the following descriptions are mainly based on searching a resume document repository using a job description document, especially, when the job description document is in an unopened state. The same methods can be reversely applied to the case of searching job postings using a resume document, and searching similar resumes to a given resume, etc., also without requiring the user to open and read the resume documents before performing a search.

Furthermore, in the embodiments of searching a resume repository with a job description document, the present invention further provides methods and user interface for displaying the search results in different formats to effectively separate the candidates that are considered to be of different strengths, such as being senior, medium-level, and junior, etc., providing the user with much more information than a keyword-based query can do.

Methods for Calculating Term Importance Scores

While a job description can specify requirements for multiple skills or experiences, some are more important than others. Usually, a job description document can have multiple sections. One section may provide a general description of responsibilities; another section may describe the skill names, experiences, positions held, abilities to do certain things, and personal and professional traits, etc. Some qualifications are required, some are preferred or optional, but as a plus.

Take the following job descriptions for example:
(1)
The candidate must have:
Experience in coding in Java & Python.
A background in Machine Learning or Information Retrieval.
Minimum BA/BS degree in Computer Science, Math, or related degree
The following are pluses:
Experience working with Lucene, Hadoop.
(2)
Minimum Qualifications:
MS/PhD in Robotics.
Experience in robotics research
Expertise in computer vision and machine learning
Preferred Qualifications:
Excellent C++ programming abilities
Experience with field robotics and systems design In examples (1) and (2), the qualifications are divided into two groups, with one for required qualifications and one for optional qualifications, by words or phrase such as "must have", "pluses", etc., even though the specific terms used in (1) and (2) are different. Each group or section can be called an importance specification scope, and the specific terms indicating whether the qualifications are required or optional can be called importance specification terms (or words or phrases).

Terms in any language, such as English, that semantically indicate a degree of importance or mandate can be collected and assembled into a list, which can also be called a dictionary or a lexicon, and stored in a computer storage media for retrieval; or be so annotated in an existing dictionary for later lookup.

In the present invention, each of such terms can be associated with a weighting co-efficient as a quantitative indication of the degree of importance. The value of the co-efficient can be different for different terms. For example, on an exemplar scale of 0 to 1, the word "must" can have a weighting co-efficient of 1, and a word such as "preferred" can have a weighting co-efficient of 0.6, and a word such as "plus" can have a weighting co-efficient of 0.4, and a word such as "nice to have" can have a weighting co-efficient of 0.1, etc. The specific value can be customized based on the specific use cases. As will be described in more detail later, the weighting co-efficient can be applied to other terms in the text that represent names of skills or experience to produce an importance score for such names.

In the present invention, once an importance specification term is identified in a job description document, its scope is further determined.

In examples (1) and (2), one method of determining the scope is to identify the content in the section that is headed by the text line containing the importance specification term. For example, the scope for "must have:" can be determined to be the content starting after the phrase "must have:", and ending before the text line that contains the next importance specification term.

Another method is to utilize the format information in the document in terms of the section boundaries, such as headings and indentions.

In some embodiments, as will be described in more detail below, the scope can be a sentence or a paragraph related to the importance specification term.

In a job description document, in addition to being a required or optional qualification, some qualifications can further be described as being of different degrees of importance of other types. Take the following job descriptions for example.
(3)
Responsibilities
Design PaaS and IaaS architecture.
Lead implementation and operation of the infrastructure.
Provide technical subject matter expertise on Hadoop.

Advise network engineers on machine characteristics.
Participate in code reviews.
5+ years experience with Cloud architecture
2-4 years experience with Ruby on Rails
Experience with non-relational database technologies
Good understanding of JSON and Web Services
Knowledge of design patterns
Familiarity with agile practices
Excellent verbal and written communication skills In example (3), different verbs and nouns are used when describing the requirements of different qualifications. For example, verbs such as "Design", "Lead", "Provide", "Advise", "Participate", etc., can be regarded as also indicating different degrees of importance, in addition to indicating the specific actions they refer to.

Furthermore, nouns or adjectives such as "Experience", "Good understanding", "Knowledge", "Familiarity", "Excellent", etc., can be regarded as also indicating different degrees of importance, in addition to indicating the specific attributes they refer to.

More words or phrase of this type can be used to indicate different degrees of importance, such as "in-depth knowledge in A", "proficient in B.", "expert in C", "ability in D is extremely important", etc.

In the present invention, such words can also be collected and assembled into a list or a dictionary, and stored in a computer storage media for retrieval; or be so annotated in an existing dictionary for later lookup, as described above.

Similarly, each of such terms can be associated with a weighting co-efficient as a quantitative indication of the degree of importance. The value of the co-efficient can be different for different terms. For example, on an exemplar scale of 0 to 1, the word "excellent" or "extremely important" can have a weighting co-efficient of 1, and a word such as "in-depth knowledge" can have a weighting co-efficient of 0.8, and a word such as "knowledge" can have a weighting co-efficient of 0.5, and a word such as "familiarity" can have a weighting co-efficient of 0.3, etc., and the weighting co-efficient can be applied to other terms in the contextually related text that represent names of skills or experience, and importance scores for such names can be produced based on the weighting co-efficient.

Furthermore, the terms indicating a duration of experience, such as "5+ years" (experience with Cloud architecture), "2-4 years" (experience with Ruby on Rails) in example (3) above, can also be associated with a weighting co-efficient, the value of which can be proportional to the length of duration. For example, a weighting co-efficient scheme between 0 and 1 can be adopted to use 1 for a duration of 10 years and more, and 0.9 for nine years, and 0.8 for eight years, etc., and their scope can be determined to be the sentence that contains such terms, and their weighting co-efficient value can be added to the calculation of the term importance score for skill name terms such as "Ruby on Rails", and "Cloud architecture".

In the present invention, the name of skills or experiences can also be identified by dictionary lookup, such as using an industry-specific glossary, or a general technical skill dictionary, etc. The compilation of such dictionaries is not the focus of the present disclosure.

Once the terms of skill names and terms of importance specification and the scope of importance specification are identified, a term importance score can be calculated for the terms in the text content, specifically, for terms that represent the names of skills or experiences.

In some embodiments, the term score of a skill name can be calculated based on the weighting co-efficient of the importance specification term when the skill name is within the scope of the importance specification term. For example, in example (1), skill names such as "Java" and "Python" are within the scope of the importance specification term of "must have", and can thus be assigned a term importance score of 1 if the weighting co-efficient of the term "must have" is determined to be 1, or another value of the user's choice. The same can be applied to other terms in the same scope.

In some embodiments, a second type of weighting co-efficient can also be applied to the names of skills or experiences, such that such terms will have a higher term importance score than terms in the same sentence or paragraph that do not represent names of skills or experiences. For example, a weighting co-efficient can be applied to the word "Java", and "Python", but not to the other words in the rest of the text line such as "experience in coding in". This way, names of skills or experiences can be further distinguished from other terms, for the purpose of extracting the most important information from the job description documents, and for more accurate search results.

In some embodiments, the frequency of the term, especially the terms representing skill names, can also contribute to the term importance score, to further indicate the importance of the term.

In some embodiments, term importance score can also be based on the grammatical attributes of the terms, such as whether a term is a noun or noun phrase, or a verb or verb phrase, etc. For example, the skill names are more likely to be nouns or noun phrases, and can thus be assigned more weight to highlight their importance in contrast to other terms in the document.

FIG. 1 is an exemplar flow chart illustrating the process of automatically searching a resume index or repository based on a job description document. Steps 110 to 116 illustrate the sub-process of calculating a term importance score for a term representing the name of a skill in a job description document.

In some embodiments, when the importance specification terms are in the same sentence or paragraph, such as "knowledge of skill A", and "familiarity with Skill B" etc., the scope of such terms can be determined as being in the same sentence or paragraph, or by a grammatical analysis of the modifying relationships between the terms in the same sentence or paragraph.

Constructing a Query and Search Using the Most Important Terms in the Source Document When the terms in the job description document are assigned term importance scores, terms that have a high score or a score above a predefined threshold can be selected as the most important terms in the document, and can be output for various uses. For example, in example (1), terms such as "Java" and "Python" will have a relatively higher score than other terms determined by the methods described above, and can be selected and output.

In some embodiments, the scores associated with the terms can be normalized, or adjusted in certain ways to facilitate the calculation. In one embodiment, a maximum score value is predefined, and if a score is above the maximum value, it is adjusted to be equal to the maximum value.

As described above, one of the objectives of the present invention is to automate the resume search process without requiring the user to read and understand the job description, and to produce more accurate results than conventional keyword-based search that may miss certain important keywords in the job description. For this purpose, the selected terms can be used to construct a search query against a resume index. Compared with the conventional approach of requiring a user to read and understand a job description and then select a limited number of keywords to search with, the present invention can identify the most important or representative words or phrases from the job description document, and can select as many words or phrases as needed to construct a query.

Furthermore, in contrast to another type of conventional resume search in which resume data are pre-extracted and stored in a database, and what is known as "structured query language" is required to search the database for exact matches, the present invention provides methods for a fuzzy-match-based search to overcome the limitations of the exact search with structured database.

For example, an employer may require a candidate to have a minimum of three years of experience in a specific skill or area. If in the resume index or database, candidates' years of experience is specified by increments in years, then a candidate with two and half year's experience may be filtered out and will not be in the search results. However, it is possible that the candidate's strength in other areas may compensate for the half year's short of experience in that area. With conventional exact-match-based search, such a candidate can be filtered out or missed.

In the present invention, as described above, a weighting co-efficient representing the importance of a duration of experience can be used in calculating the term importance score. For example, on a 0 to 1 scale, a number of 0.3 may be used to represent the importance of "three years", and be used with other weighting co-efficient related to the skill name when calculating the term importance score, and the resume of a candidate with two and half year's experience in that area can still be retrieved as a fuzzy match, especially if the candidate's has another skill that can compensate the half a year shortage, thus having a high overall score to qualify as a relevant result to the search.

The methods of the present invention also overcomes the disadvantage of conventional search in requiring the user to read and understand the job description, and to learn to use the structured query language, and then to manually construct a query, and to query with only a limited number of keywords due to the intensive human labor required in constructing a complex query.

In some embodiments, the term importance scores are also output. The output terms together with their associated importance scores can be represented in the form of a term vector.

FIG. 2 shows an exemplar term vector based on the job description document in example (1) above.

The term vector can be used in comparison with a resume term vector, and resumes that have the most similar term vectors with the job description term vector can be selected as search results and ranked by the similarity score as a relevance score when displayed to the user.

Various methods of calculating the similarity between a job description and a resume can be used. Commonly known methods can include dot product, cosine, and vector distance, etc., as well as other customized calculation methods.

In some embodiments, the similarity measure can be determined by the number of terms that are found in both the job description and resume documents, or by the number of terms that represent names of a skill or a position or a job role or an education level, etc., as terms that are more important than other terms in the document.

In some embodiments, the similarity measure can be determined by the number of terms with importance scores above a threshold that are found in both the job description and resume documents.

Figure 3:
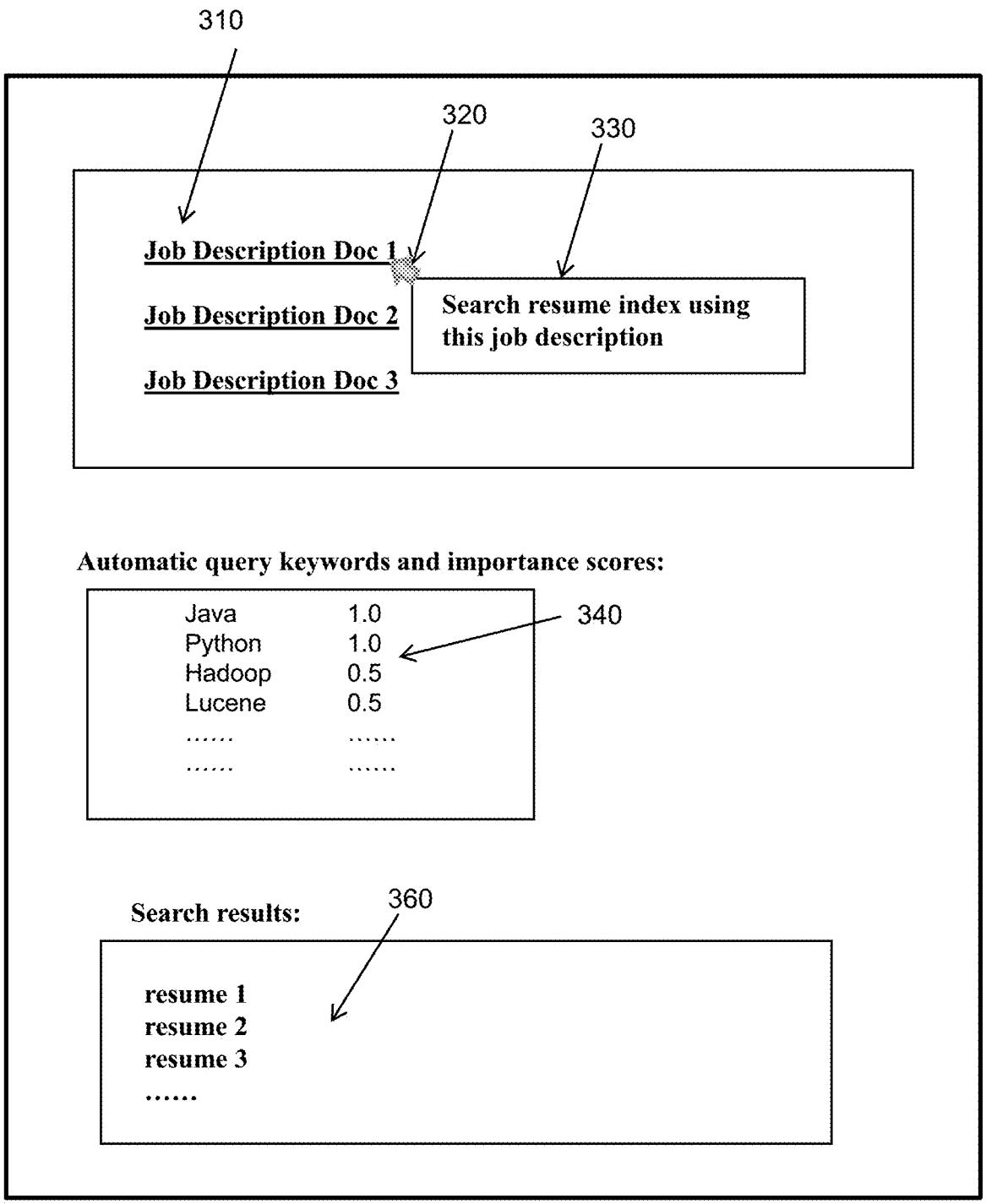
FIG. 3 shows an exemplar user interface for conducting an automatic search against a resume index using an unopened job description document, and with automatically generated search queries displayed together with the importance score of each query term.

FIG. 3 shows an exemplar user interface for conducting an automatic search against a resume index using an unopened job description document. In FIG. 3, when the user selects or acts on the document object icon of the job description (310), such as right-clicking on a document icon (320), the user can choose to perform a search (330) without opening the document, and the result can be displayed in a display area (360). Optionally, the most important terms extracted from the job description as the search query (340) can be display in a separate window, and the user can modify the automatically calculated importance score for each term before starting the search, or for a modified search.

In some embodiments, the user can initiate a search using other methods that are different from right-clicking on the document icon as illustrated in FIG. 3. Such methods can include letting a computer system automatically start the content analysis and search process once a job description document is received by the computer system, or a user indication is received by the computer system. The user can specify a location of the document, or provide a link to the document, or submit the document to the system. The system can either display the results to the user in a user interface, or deliver the results to the user for later viewing.

In addition to searching against a document index or a document repository, the methods of the present invention can also be used when searching in a database.

Applying the Methods to Resume Documents

The methods described above for identifying and calculating a term importance score for terms in a job description document as unstructured data can also be used for resume documents which are also a type of unstructured data.

The contents of resume documents can be in various formats, but by convention, they contain at least two basic sections, with one for the past experiences and one for education. Sometimes, additional sections can also be included to provide additional information such as a summary of skills and experiences. As a common practice, employment histories are often presented in sub-sections, each representing a work experience with a particular employer, together with starting and ending date information from which the duration of each period can be inferred.

Compared with a job description such as in examples (1), (2), and (3) above, a resume usually does not specify what skills are required and what skills are optional. However, apart from this difference, other parts of a resume share much in common with a job description in terms of presenting information about skills or experiences in different degrees of importance, or the degree of strength of a skill or experience.

For example, once a skill name is identified, one of the indications of strength is the duration of employment related to the skill. And as described above, the duration can be associated with a weighting co-efficient representing a quantitative measure of the degree of strength of the candidate's skill. The duration information can be obtained from the heading text line of each sub-section of employment history. It can also be determined that the scope of the duration covers the corresponding sub-section, thus term importance scores can be calculated for the terms representing skill names in the sub-section, based at least on the weighting co-efficient of the duration for this section. Furthermore, duration can be cumulative from the candidate's work history at different employers.

In addition to the duration of work utilizing a particular skill, grammatical, semantic, and contextual attributes of the terms in the same sentence or paragraph as the skill names can also be used in determining the strength of a skill. Specifically, certain verbs or nouns describing or modifying a particular skill or experience name can be used as indicators of the strength of the skill. For example, some resume may contain text lines such as "Designed PaaS and IaaS architecture", "Led implementation and operation of the infrastructure", "Provided technical expertise on Hadoop", and "Advised network engineers on machine characteristics", etc., which are similar to the job description case in example (3) above.

In resume documents, verbs such as "Designed", "Led", "Provided", "Advised", "Participated", etc., can also be regarded as indicating different degrees of strength of the object noun or noun phrase they modify, in addition to indicating the specific actions they refer to.

In addition to verbs, in resume documents, nouns or adjectives such as "Experience", "Good understanding", "Expert knowledge", "Familiarity", "Excellent", etc., can also be regarded as indicating different degrees of strength of another noun or noun phrase they modify in the same sentence or text line, in addition to indicating the specific attributes they refer to.

More words and phrases can be used to indicate different degrees of importance, such as "in-depth knowledge in A", "proficient in B.", "expert in C", "ability in D", etc.

Other attributes can also be identified and used to determine term importance score, or the strength of the qualifications. Such attributes can include the person's level of education, previous job position, role, project type, achievements, location, industry category, type or size of company, number of companies worked, years or months of experience, maximum or minimum length of time stayed with a company, type of employment such as whether the candidate worked as a consultant or a part-time or full-time employee, etc. Different weight values can be assigned to terms that represent such attributes.

In linguistic studies, a multi-word phrase can be called a complex phrase, which can further be broken down into sub-components such as sub-phrases and single words. The sub-components of a complex phrase can have a modifier-head relationship, such as "good understanding" in which the word "good" modifies the word "understanding". Similarly, in a phrase such as "proficient in skill B.", the word "proficient" can be regarded as a modifier of the word "skill B", etc. In some embodiments, a verb can also be regarded as modifying its object noun, or vice versa, and the scope of modification can be determined by the grammatical attributes associated with the words or phrases. In addition to the verbs and nouns, words in the grammatical category of prepositions such as "in", "with" etc., can be used to identify the modification relationships between the components in a sentence and components within phrases in the sentence.

In conventional document search, a recruiter with a job description that requires four years of C programming experience may enter keywords such as "four years", "C programming", etc., as a search query. If a resume containing information such as "having basic knowledge in C programming", and "tested software products for four years" exists in the repository, a conventional search engine may likely return the resume as highly relevant due to the presence of the keywords of "four years" and "C programming", which likely does not meet the requirements. However, using the methods of the present invention and in the referenced disclosures that identify the grammatical and semantic attributes of the terms and their relationships, the term of "four years" is not identified as a term modifying the skill name of "C programming", thus the strength score for the skill name of "C programming" will not be high for this resume. On the other hand, if another resume has such contents as "worked five years with C programming", the present invention can identify the term "five years" as a modifier of the term "C programming", and assign an appropriate weight value to the term of "C programming". Thus, in response to the query containing "C programming" and "four years", even though the keyword "four years" does not match the actual word of "five years", the present invention can assign a relatively high weight value to the keyword "C programming", thus giving the resume a high strength score, with which it will likely be retrieved as a high-relevance search result.

Similar to the methods described above for job descriptions, in resume documents, terms that indicate importance or strength, and terms that represent names of skills or experiences, can be identified by dictionary lookup, either by compiling specific word lists, or by adding annotations in exiting dictionaries. Such a dictionary can be compiled either manually, or automatically or semi-automatically using a machine-learning or algorithmic method. Meanings can also be contextually determined by various rules for contextual analysis, and such rules can also be compiled either manually, or automatically or semi-automatically using a machine-learning method.

Furthermore, weighting co-efficient values can be associated with such terms, and term importance scores or skill strength scores for terms that represent names of skills or experiences can be calculated based on the weighting co-efficient.

Also similar to the methods for job descriptions described earlier, terms representing skill names can have their additional weighting co-efficient to contribute to the calculation of their skill strength scores. And in some embodiments, the grammatical attributes such as whether the term is a verb or a noun, and the frequency of the term in the resume document can also be associated with a weighting co-efficient to be used in the calculation of the skill strength scores.

Once the skill strength scores are calculated for the terms that represent skill names, those terms that have a high score or a score above a predefined threshold can be selected as the most important terms in the resume document, and can be output for various uses.

Similar to the job description cases described above, in the resume case, the selected terms can be used to construct a search query for searching against either a job description index, or a resume index, or a related repository of individual documents.

When the query is performed against a job description index, job postings that most closely match the resume can be returned as search results. In this case, the job seeker does not need to manually select keywords from the resume to construct a query. The system of the present invention can take the resume document as an input, and analyze the content and extract the most important words or phrase as a query string.

When the query is performed against a resume index, other resumes that most closely match the current resume can be returned as search results. This is particularly useful when a recruiter does not receive a job description, but receives instructions from an employer or hiring manager to find a candidate that is similar to a person whose resume is on file. Again, the recruiter does not need to manually read and select keywords from the resume to construct a query. The system of the present invention can take the resume document as an input, and analyze the content and extract the most important words or phrases as a query string. Furthermore, this method can also be used to find other candidates who may be more experienced or senior or junior than a person with an existing resume.

Also similar to the case with job description documents described above, in some embodiments, the term importance scores or skill strength scores are also output. The output terms together with their associated scores can be represented in the form of a term vector. And the vector can be used to compare with either a job description term vector or a resume term vector, and the target term vectors that are the most similar with the resume term vector can be selected as search results and ranked by the similarity score when displayed to the user. Various methods of calculating the similarity between the term vectors can be used. Commonly known methods can include dot product, cosine, and vector distance, etc., as well as other customized calculation methods.

Also as illustrated in the case with job description documents described above, in some embodiments, the similarity measure or the similarity score can be determined by the number of terms that are found in both the job description and resume documents, or by the number of terms that represent names of a skill or a position or a job role or an education level, etc., as terms that are more important than other terms in the document.

In some embodiments, the similarity measure can be determined by the number of terms with importance or strength scores above a threshold that are found in both the job description and resume documents.

Figure 4:
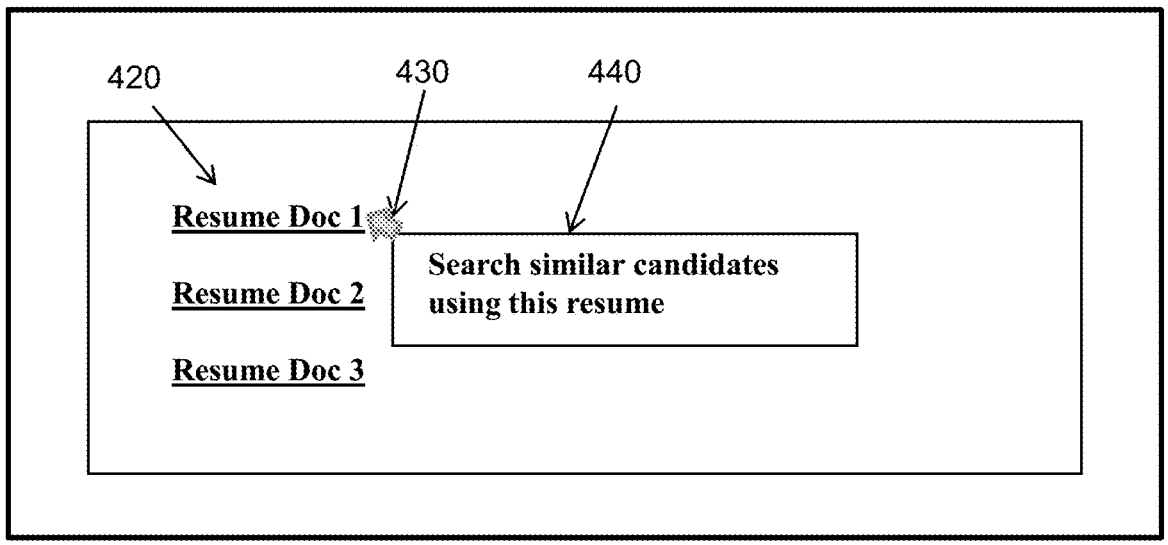
FIG. 4 shows an exemplar user interface for conducting an automatic search against either a job description index, or a resume index using an unopened resume document.
Figure 4:
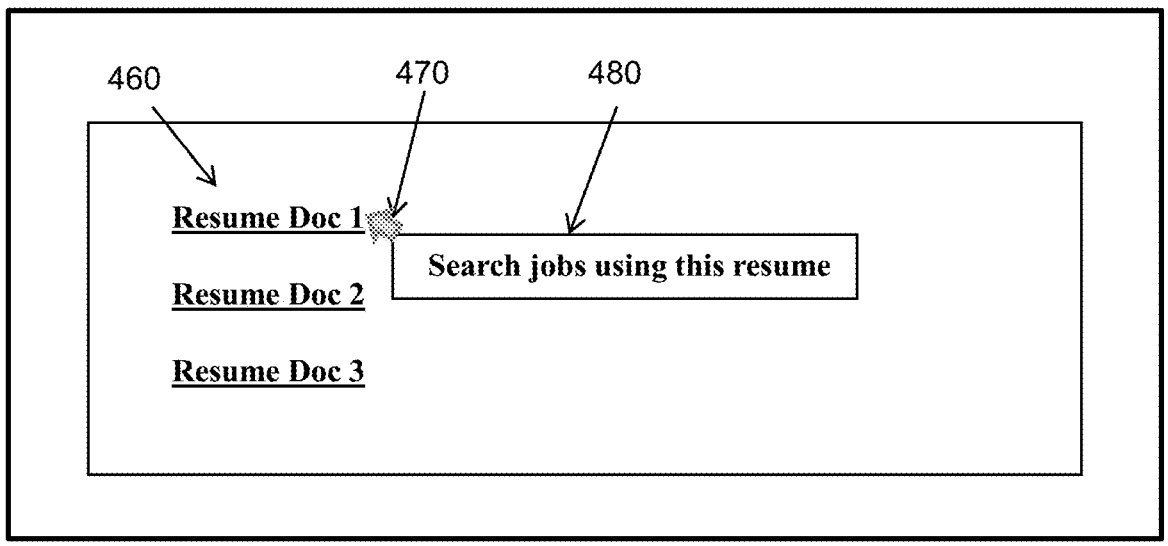

FIG. 4 shows an exemplar user interface for conducting an automatic search against either a job description index, or a resume index using an unopened resume document. In FIG. 4, when the user selects or acts on the document object icon (420, 460), such as right-clicking on the file icon (430, 470), the user can select an index (410, 450), and perform a search (440, 480) without opening the document, and result can be displayed in a display area.

In some embodiments, the user can initiate a search using other methods that are different from right-clicking on the document icon as illustrated in FIG. 4. Such methods can include letting a computer system automatically start the content analysis and search process once a document is received by the computer system, or a user indication is received by the computer system. The user can specify a location of the document, or provide a link to the document, or submit the document to the system. And the system can either display the results to the user in a user interface, or deliver the results to the user for later viewing.

In addition to searching against a document index or a document repository, the methods of the present invention can also be used when searching in a database.

As described, the result can be ranked by the relevance scores based on the similarity measures. In the case of search with a resume index, the relevance scores in resumes represent the strength of the candidates. In some cases an employer is looking for a senior candidate, in some other cases, an employer is looking for a medium-level candidate, or even for a junior candidate. In such cases, the results can be displayed in separate areas based on the relevance scores, such as one area for high-scoring and thus more senior candidates, and one area for medium-level candidates, and one area for junior candidates, so the recruiter can easily look though the results to find the candidate that best fits the position. The same can also be applied when searching against a job description index.

In certain cases, some candidates can be regarded as over qualified; while others may be regarded as under qualified, etc., based on the strength measure. Labels such as "senior", or "strong", or "medium", or "junior", or "over qualified", or "under qualified", etc., can be used to indicate the displayed group's content types. In some embodiments, the results are displayed in one area, such as a list, but individual results can be associated with a label to indicate whether it is a candidate of senior, or junior or medium level, etc., as an equivalent to the grouping.

Figure 5:
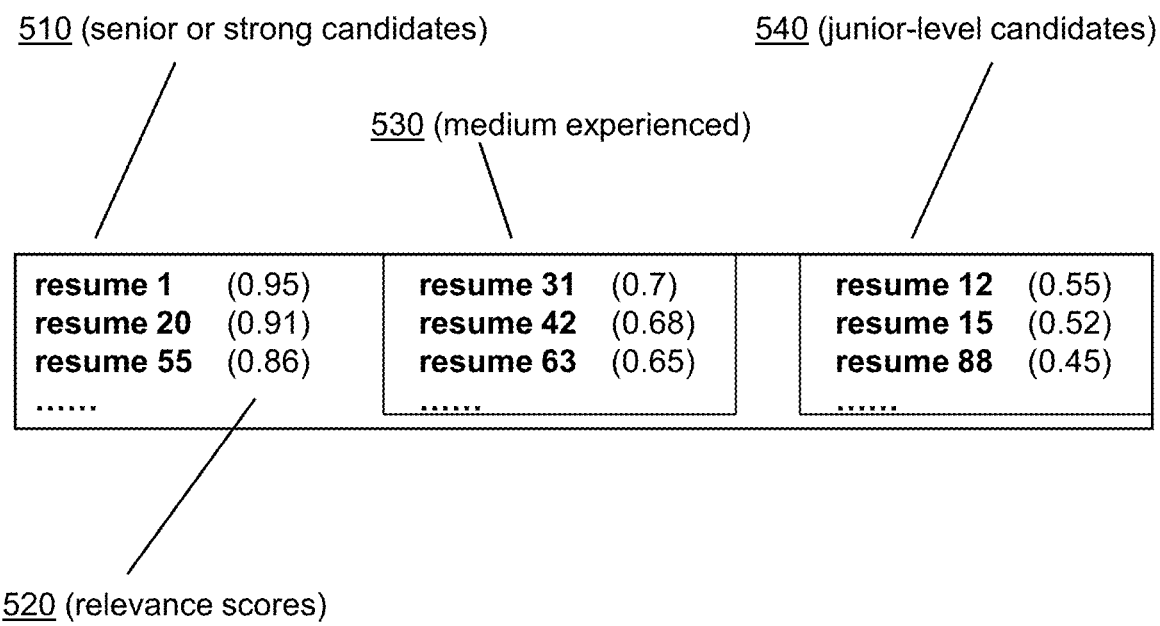
FIG. 5 shows an exemplar user interface with resume search results being ranked by relevance score and displayed in different display areas for different levels of qualification strength.

FIG. 5 shows an exemplar user interface with resume search results (510) being ranked by relevance score (520) and displayed in different display areas based on the relevance scores, separating the senior candidates from medium-level candidates (530) and junior candidates (540) based on the skill strength as relevance scores.

In some embodiments, the search results with different relevance scores can be displayed in different visual effects, such as in different colors, or different character styles, sizes, or positions, or with special annotations, etc.

The exemplar user interface in FIG. 5 can also be used for searching job descriptions with a resume document. When a job seeker submits a resume to the computer system of the present invention, job descriptions matching the result with a relevance score above a threshold can be displayed in a similar format as illustrated in FIG. 5. This is especially useful for a user to know which positions are the best fit, or the second best fit, etc. The results can be divided into groups with labels to indicate whether the positions are for senior, or junior or medium-level candidates, etc. In some embodiments, the results are displayed in one area, such as a list, but individual results are associated with a label to indicate whether it is a position suitable for senior, or junior or medium-level candidates, etc., as an equivalent to the grouping method.

The relevance scores associated with the search results can also be displayed in other formats, such as in a report. In some embodiments, the relevance score values can be different from the similarity score between the two vectors, such as being in a different scale or in a different range, or further modified by using an additional weighting co-efficient for one or more particular terms in the job description or resume document, to reflect the specific term importance or strength score for the overall relevance.

User Interface and Template for Specifying Importance for a Search Parameter

The term importance score as illustrated in 340 in the present invention can also be applied as an added feature to conventional search that only uses keywords in the query.

The use of a score like this to represent the fuzzy nature of unstructured data can overcome the disadvantages in exact-match-based search.

For example, as illustrated above, an employer may require a candidate to have a minimum of three years of experience in a specific skill or area. If in the resume database, candidates' years of experience is specified by increments in years, then a candidate with two and half year's experience may be filtered out and will not be in the search results. However, it is possible that the candidate's strength in other areas may compensate for the half year's short of experience in that area. With conventional search approaches, such a candidate can be filtered out or missed. In the present invention, user interface objects are provided to let the user of the search system specify how important this criterion is, for example, to specify a value on a 0 to 1 scale, and the system can calculate the relevance of the search results accordingly. For example, if the user specifies a value of 0.7, then, a candidate with two and half year's experience in that area can still be considered as meeting the requirement, and can be presented in the search results.

FIG. 6 shows an exemplar user interface of the present invention. Users can specify a skill name (610) such as "Skill A", an additional requirement associated with the skill (620) such as "three years of experience", and an importance or relevance value (630) such as 0.7 associated with the skill as well as its additional requirements. The system can check with the resume database or index, and calculate a relevance score for the parameter of "three years of experience", which, in some embodiments, can result in an effective value of "2.1 years", thus a candidate with 2.5 years of experience in that area can still be presented, based on the assumption that the employer is willing to consider such a candidate, and optionally, the result can be displayed in a different format to indicate the special case.

Furthermore, applying the user interface as described above, the present invention provides additional methods as a solution to the problem with the conventional resume search. Usually, a recruiter needs to digest the information in a job description and construct a query to perform a search. One solution provided by the present invention is to create a template, or an electronic form, which can be used to create job descriptions. For example, the template can have fields for skills, and each skill can have associated fields for additional requirements such as years of experience in this skill, and type of projects worked using this skill, etc. Furthermore, in the template or the electronic form, additional fields can be provided to let the user further indicate how important such a skill or the associated requirements are. For example, as described above, if the employer requires a minimum three years in skill A, the employer can further specify that this requirement has an importance score of 0.8, etc. A template like this can turn an otherwise unstructured data type into a more structured format to facilitate automated search, and the additional feature of letting the user specify the degree of importance or relevance for a specific search parameter can produce more satisfying results than conventional approaches. The exemplar user interface illustrated in FIG. 6 can readily be used for such a template or electronic form.

Displaying Itemized Scores and Comparing Strength Scores with Requirement Scores In addition to displaying the relevance score for the search results, such as illustrated in 520, and displaying term importance scores, such as illustrated in 340 in the search process, such scores can also be displayed as a report or a component of a report.

For example, when the search is using a job description against a resume index or repository, for one or more of the resumes as the search results, a report can be generated to show the strength and weakness of a candidate in specific areas.

FIG. 7A is an illustration of part of a report showing the strength scores of itemized skills or experiences of a candidate, (in a similar format as illustrated in 340). This way, the recruiter or the employer can easily have more detailed information about the strengths or weaknesses of a particular candidate in particular areas, without having to read through the entire resume.

In some embodiments, the importance score of the corresponding items in the job description can also be displayed in association with the strength scores in the resume, such that the recruiter can easily compare the strength scores with the importance scores for specific items, and make an appropriate decision based on the comparison. For example, the job description may state that five years experience in Java programming is required, while the experience in C++ programming is a plus but not required. In such a case, the importance score for the term of "Java" may be of a value 1, while that for "C++" may be 0.5. On the other hand, the candidate may have a strength score for "Java" being 0.8, but a strength score for "C++" being 0.9. With such information displayed in a report or in search results, the employer can easily and quantitatively compare the candidate's strength with the job requirements, and can make a decision based on the comparison.

FIG. 7B is an illustration of a report showing the strength scores of itemized skills or experiences of a candidate in comparison with a particular job description. The report can also contain an item that only exists in the job description document but not in the resume document (730-750), to show a gap between the requirements and the qualifications. If a candidate lacks a skill or experience in a certain area, the corresponding score can be set to 0 or be omitted.

The same method can also be applied when a job seeker is searching a job description repository, or even when not searching anything.

For example, when a person has written a resume document, or a similar content describing the person's attributes, the person can submit the document to the system of the present invention, and a report such as the one illustrated in FIG. 7A can be generated, with a component showing specific items related to skills or experiences, and the strength scores associated with such items. This way, the person can have a quantitative knowledge of his or her own strengths or weaknesses in particular areas.

In some embodiments, strength scores of the same item can be obtained from other persons, and an average value can be calculated and displayed for the person to compare his or her strength with the average, such as the average for that skill in a specific professional domain, or in a specific time period, or in a specific user group, such as job seekers considered as being either advanced, intermediate, or entry level, etc. FIG. 8 is an illustration of such a report with comparison of scores with other persons' scores.

In addition to generating a report for a person's own knowledge, the methods can also be applied when the person is searching for a job position. In such a case, when the search results contain one or more job positions that meet a relevance threshold, the report can contain the importance scores for the corresponding items as described in the job descriptions.

In some embodiments, different reports or different score components in a report can be generated for multiple job positions in the search results. For example, the report similar to the one illustrated in FIG. 7B, or a variation of it, can be generated and displayed to the job seeker. This way the job seeker can easily have a quantitative understanding of the strength or weakness or gaps between the person's current level and the requirements of various jobs.

In some embodiments, importance scores of the same item can be obtained from multiple job descriptions, and an average value can be calculated and displayed for the person to compare his or her strength with the average, such as the average required by employers in a specific professional domain, a in a specific time period, or a specific position group, such as senior, junior, medium-level positions, etc.

In some embodiments, certain items can be highlighted for special attention, such as when there is a big gap between the person's strength score for that item, and the importance score of various types as described above. In some embodiment, suggestions for skill improvement in certain areas or improvement in resume writing can also be generated and displayed.

In some embodiments, the strength score or the importance score can be displayed in different formats to represent the quantitative measurements, such as various visual effects in the form of size, color, shape, etc., in addition to the numerical values.

In some embodiments, the strength score or the importance score can be displayed in the form of a text message based on the numerical value of the score, or with a description of the meaning of the score.

In some embodiments, the person's resume or a related content is stored in an accessible place, such as on a web server or document repository, or can be accessed by the present system, a report can be generated for the person, without requiring the person to submit the document.

Methods and User Interface for Searching Jobs or Candidates without Using a Keyword-Based Search Usually, a company has a webpage for multiple job openings, and a job seeker may need to browse through various job descriptions to find a suitable position to apply. Often the job seeker may not be able to look through the entire company job site, and the specific position that the job seeker applies for may not be the best fit for either the job seeker or the company. However, using the present invention, the company can allow the job seeker to run a test or run a real submission with a resume, and the system of the present invention can produce a report showing which jobs in the company job site fit the job seeker the best, such as by showing multiple positions with a score for each based on the search relevance score. The job seeker can then focus on applying for the position that fits the seeker the best. In the test mode, the company can display a message or a label on the site such as "Submit your resume to see which position fits you the best before applying."

On the other hand, the company can also let a job seeker simply submit a resume without specifying which position the submission is for, and use the system of the present invention to produce a relevance score for each open position based on the resume content, and send the resume to the hiring manager of the position that matches the resume the best. For example, on a company website, a message such as "Submit your resume and we will match you with a position that fits you the best." can be displayed.

In some embodiments, the message can be a label associated with a user interface object, such as a button, that allows the user to specify a resume, or to start a search using a resume. For example, a button can be provided and the button label can be "Submit your resume and get job info", etc.

Optionally, when a resume is submitted, a report with detailed scores as described above can also be generated and displayed.

Figure 9A:
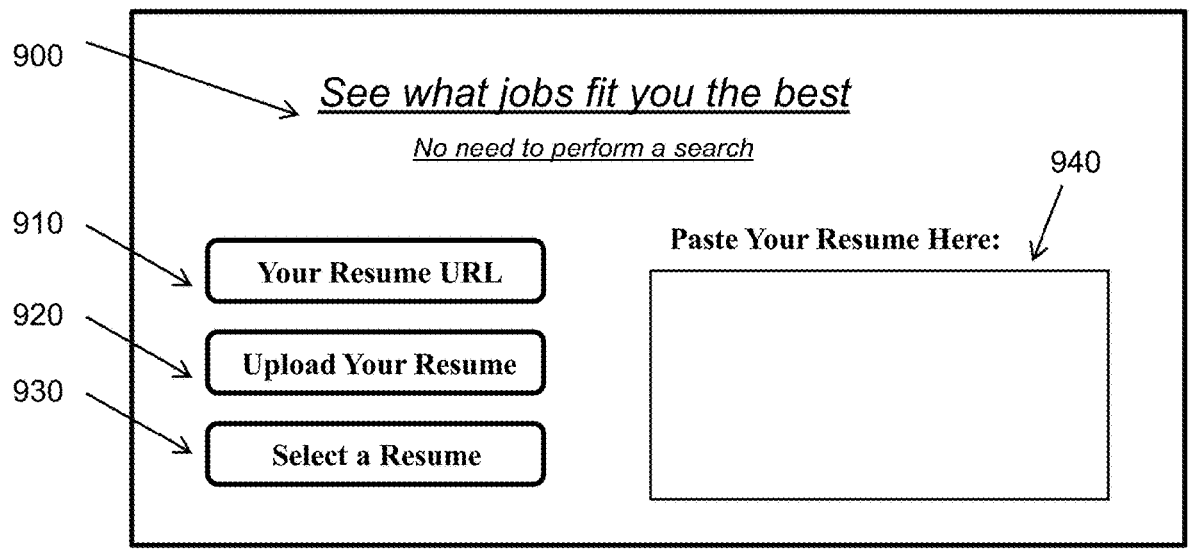
FIG. 9A shows an exemplar user interface for letting a job seeker submit a resume and get relevant results using the system of the present invention.

FIG. 9A shows an exemplar user interface for letting a job seeker submit a resume and get relevant results using the system of the present invention. In FIG. 9A, a message (900) is displayed to the user, informing the user that the user can find relevant jobs without performing a search. And user interface objects (910)-(940) are provided for the user to specify a resume document source.

In some embodiments, a job service provider can collect multiple job descriptions from multiple companies, and allow a job seeker to do the same as described above. In contrast to the conventional job search method of entering a keyword for a specific job title, etc., using the present invention, the job service provider can allow the job seeker to simply specify which company or a location the seeker is interested in, and then perform a search using the methods of the present invention, and when appropriate results are produced, the service provider can inform the seeker which position in that company fits the seeker best. For example, on the job service provider's website, a message such as "Specify a company or location, and we will tell you which position fits you the best." can be displayed. Optionally, when a resume is submitted, a report with detailed scores as described above can also be generated and displayed.

This can especially be useful for job services such as college career centers, as college graduates are usually more open for many types of jobs, and are usually not experienced in using carefully crafted keywords for searching with conventional search systems. However, the system of the present invention can allow the job seeker to simply submit a resume, and the system can check all potential job postings in the database, and provide many relevant opportunities that the job seeker may have never thought about, or would have not been able to discover.

In some embodiments, information such as how many people have searched for a particular job or a particular company, as well as what scores are associated with the search results can be displayed. An advantage of displaying such information is that this can make the job application process more transparent.

The same features as described above can also be applied when a recruiter or employer looks for job candidates. The service provider can collect resumes from multiple job seekers, and can allow a recruiter to simply submit a job description, and the system of the present invention can display or deliver the relevant results to the recruiter, without requiring the recruiter to conduct a keyword-based search. A report can also be provided with detailed information about the candidates' strength.

Figure 9B:
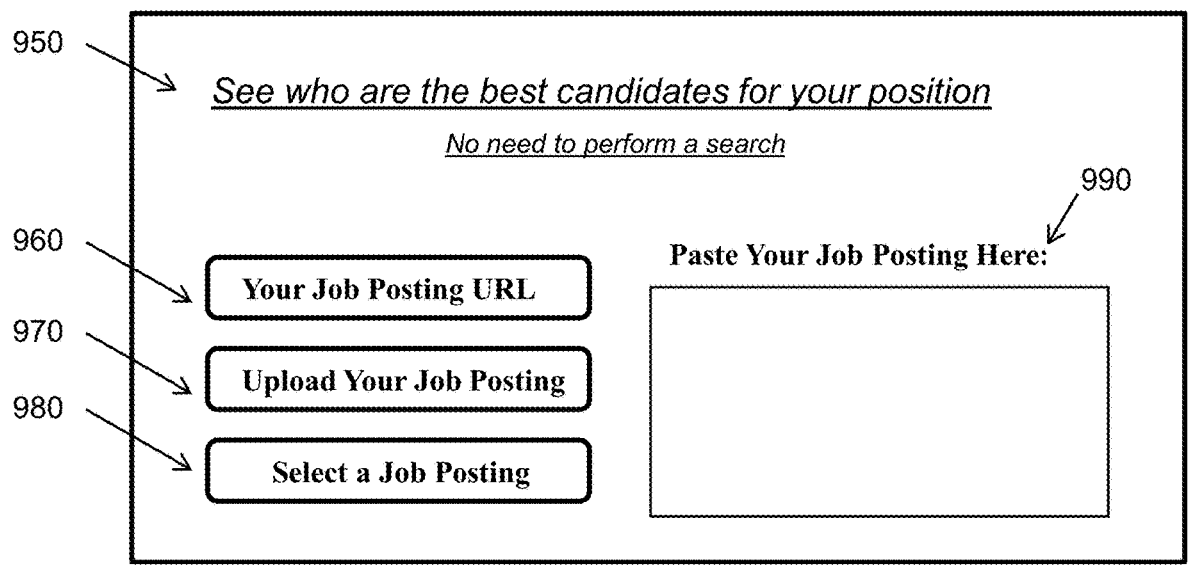
FIG. 9B shows an exemplar user interface for letting a recruiter or employer submit a job description and get relevant results using the system of the present invention.

FIG. 9B shows an exemplar user interface for letting a recruiter or employer submit a job description and get relevant results using the system of the present invention. In FIG. 9B, a message (950) is displayed to the user, informing the user that the user can find relevant job seekers without performing a search. And user interface objects (960)-(990) are provided for the user to specify a job description document source.

The above descriptions are based on examples of resume or job description documents as unstructured data type. However, the system, methods, and user interface of the present invention can also be applied to resumes or job descriptions stored in structured databases, such as measuring the strength of a skill, and ranking and displaying the results.

The system, methods, and user interface of the present invention can be implemented on a variety of computing devices or network systems.

Figure 10:
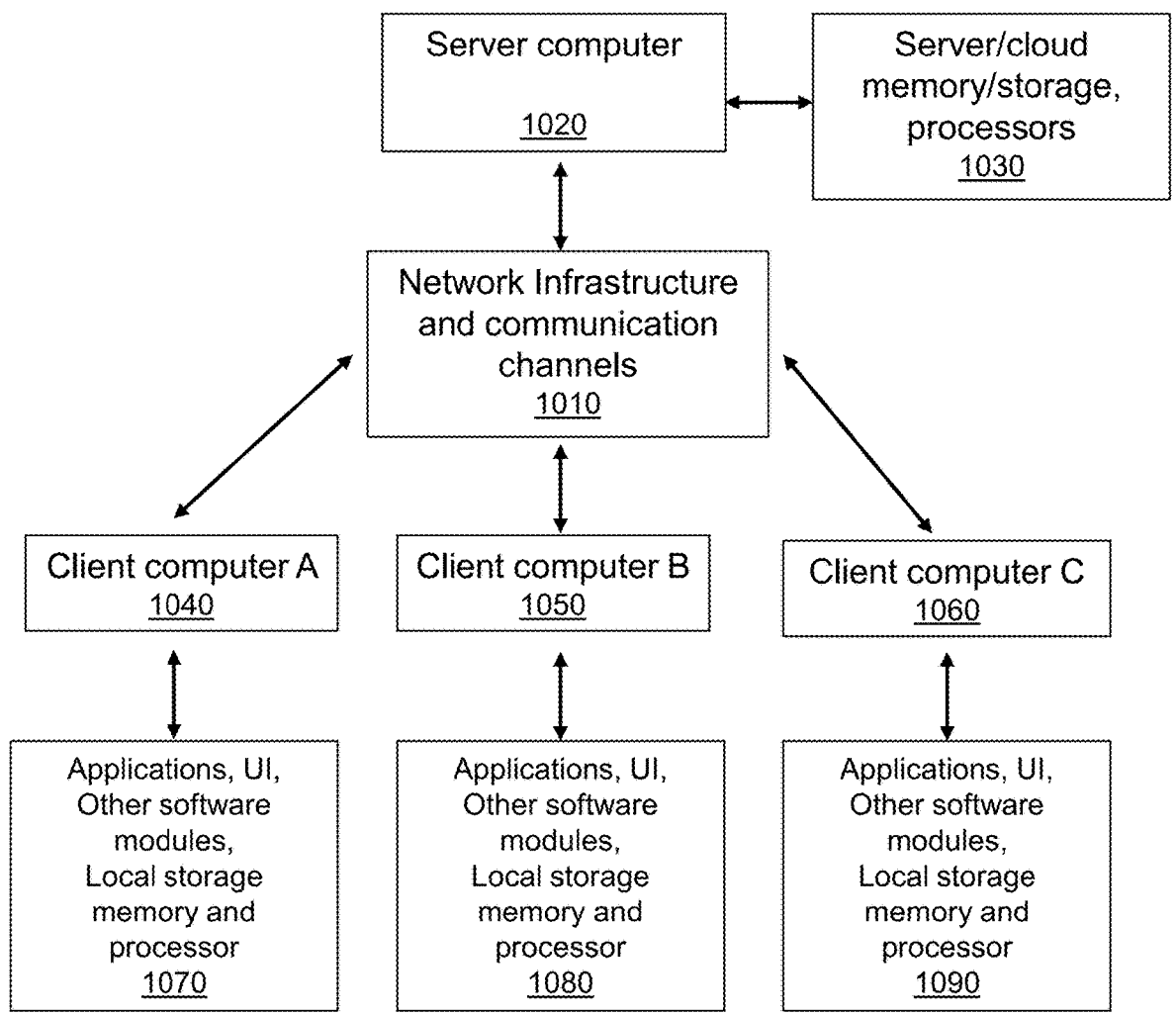
FIG. 10 illustrates the components of a computing system on which the present invention can be implemented.

FIG. 10 is a diagram illustrating a system in the form of a computer network comprising servers, client computers, and related components, where the electronic communications such as sending documents or search queries and receiving search results and reports are carried out and where the present invention is implemented.

In FIG. 10, one or more of the client computing devices (1040), (1050), and (1060), etc., are connected with each other and with one or more server (1020) computing devices through a network infrastructure and communication channels (1010). The server computing device (1020) is equipped with its own hardware processors and memory modules, and local or cloud-based storage media (1030) which can store the resume or job description documents or indexes or databases, as well as resume or job description processing software modules. The client computing devices can have their own local storage, as well as memory modules and processors, coupled with various software modules including Web browsers, user interfaces, and text analysis software modules (1070), (1080), and (1090), etc. A user interface device includes devices such as a desktop, laptop, a mobile device with a screen, a television, or any other device with a display.

Search queries can be sent and received by the client computers and displayed in the user interface for composing and viewing, or can also be processed on a client computer. Users of the client computing devices can launch software applications to perform searches and view results on the user interface.

The methods of the present invention include applying content analysis including grammatical or semantic analysis to unstructured text data to identify importance terms, to further identify additional information or attributes associated with the importance terms, with such additional information or attributes represented by other terms in the document, to determine an importance of a search term, and to display the search results based on such relevance.

The system, methods, and user interface illustrated with the specific examples are equally applicable to other types of documents or text object, such as proposals, reports, articles, etc., and can be applied to other areas or domains without deviating from the principle spirit of the present invention.

What is claimed is:

1. A computer-implemented method for transforming a job description document into a search query and searching resume documents, comprising:
    receiving a job description document;
    transforming the job description document into a query for searching resume documents by analyzing and extracting terms in the job description document;
    receiving a search index or database associated with a plurality of resume documents;
    performing a search using the query against the search index or database;
    determining a relevance score for at least one resume document based on the query; and
    receiving a search result containing at least one resume document with a relevance score above a threshold, wherein the relevance score is produced by:
    (1) analyzing the job description document,
    (2) identifying, in the job description document, a group of terms, wherein each term in the group represents a name of an element selected from the group consisting at least of a skill, a position, a job role, or an education level,
    (3) for a first term in the group of terms, assigning a term importance measure to the first term based on a machine-performed analysis of the first term, wherein a value of the importance measure is determined based on whether the first term is identified as representing a skill, a position, a job role, or an education level in the job description document,
    (4) matching the first term with one or more terms in the resume document or the search index or database, and
    (5) producing the relevance score for the resume document based on the term importance measure when the first term matches one or more terms in the resume document.

2. The method of claim 1, wherein the steps further comprising:
    identifying, in the job description document, a second term in the context of the first term, wherein the second term represents an attribute associated with the first term, wherein the term importance measure is assigned to the first term further based on the attribute.

3. The method of claim 1, further comprising:
    identifying a third term in the job description document, wherein the third term is identified as not representing a skill, a position, a job role, or an education level;
    assigning a greater importance measure to the first term, and assigning a smaller importance measure or no importance measure to the third term.

4. The method of claim 2, wherein the attribute represented by the second term comprises a grammatical attribute indicating a grammatical relation between the first term and the second term.

5. The method of claim 2, wherein the attribute represented by the second term comprises a semantic attribute based on a meaning of the second term modifying the first term.

6. The method of claim 5, wherein the meaning of the second term comprises a duration or a strength or depth.

7. The method of claim 1, wherein the importance measure is represented by a numerical value or a text description or a visual object, the method further comprising:
    displaying at least one term in the group of terms and the importance measure in association with the display of the resume document or its representation, as additional information about the match between a requirement described in the job description document and a candidate's qualification described in the resume document.

8. A computer-implemented method for searching resume documents, comprising:
    obtaining a search query, wherein the query comprises one or more terms or a job description document comprising one or more terms;
    obtaining a plurality of resume documents or a resume search index associated with a plurality of resume documents, each comprising a plurality of terms, wherein at least one of the terms represents a name of a job-related skill or experience or qualification, and is associated with an indicator indicating a degree of strength of the skill or experience or qualification, wherein the indicator includes a numerical value or a text description or a visual object, wherein at least one term in the resume document matches a term in the query;
    for one or more of the resume documents, calculating a score based at least on the indicator;
    selecting one or more resume documents as a search result, wherein the score for each of the one or more resume documents is above a threshold;
    dividing the search result into a first group and a second group, or attaching a first label or a second label to the one or more resume documents in the search result, based on the score; and
    displaying, in a user interface, the first group in a first display area or in a first display format, and the second group in a second display area or in a second display format, wherein at least one of the groups has a label representing the content type of the group; or displaying the first label or the second label in association with the one or more resume documents in the search result, wherein the content type of the group or the first label or the second label includes at least "senior", or "medium", or "junior".

9. A computer-implemented method for transforming a document into a different data object, comprising:
- obtaining a job description document as a first document;
- identifying a first term in the job description document;
- identifying whether the first term represents a skill, a position, a job role, or an education level;
- producing a first indicator for the first term, based on a machine-performed analysis of the first term, wherein a value of the first indicator is determined based on whether the first term is identified as representing a skill, a position, a job role, or an education level in the job description document, wherein the first indicator indicates whether the first term is more important than another term in the job description document, and represents a first importance measure of the first term in the job description document;
- extracting the first term from the job description document;
- associating the first indicator with the first term;
- producing a report as a new type of data object to represent information extracted from the job description document, wherein the report comprises the first term and the first indicator; and
- outputting the report.

10. The method of claim 9, wherein the first indicator is a numerical value, or a text description, or a graphic form with a visual effect.

11. The method of claim 9, wherein the report further comprises a second indicator associated with the first term, wherein the second indicator represents a second importance measure of a term representing an element selected from the group consisting at least of a skill, position, job role, education level obtained from a second document.

12. The method of claim 11, wherein the second importance measure is based on a plurality of importance measures obtained from a plurality of second documents.

13. The method of claim 12, wherein the plurality of second documents are obtained from job description documents associated with employers in a specific professional domain, or associated with a specific position type, or collected in a specific time period.

14. The method of claim 11, wherein the second document is a resume document, wherein the second importance measure is a strength measure of the first term representing the element obtained from the resume document.

15. The method of claim 11, wherein the second document is a resume document obtained from a search result.

16. The method of claim 15, wherein the resume document obtained from a search result has a relevance score above a threshold.

17. The method of claim 11, wherein the report further comprises a second term and a third indicator associated with the second term, wherein the second term is obtained from a resume document, wherein the second term represents a name of an element selected from the group consisting at least of a skill, a position, a job role, an education level, wherein the second term does not have a match in the first document, wherein the third indicator represents an importance measure of the element obtained from the resume document.

18. The method of claim 9, further comprising:
- determining the first importance measure for the first term based on its grammatical or semantic attribute;
- wherein the first indicator is produced based on the first importance measure.

19. The method of claim 9, further comprising:
- identifying a third term in the first document, wherein a meaning of the third term semantically indicates a degree of strength of the element;
- associating a weighting co-efficient with the third term; and
- identifying a relationship between the first term and the third term, wherein the third term has a modification scope, wherein the first term is within the modification scope.

20. The method of claim 19, wherein the first indicator is produced further based on the weighting co-efficient.

* * * * *